Feb. 15, 1927. 1,617,912
H. KAFKA ET AL
MEASURING DEVICE FOR HIGH VOLTAGE NETWORKS
Filed Nov. 30, 1923
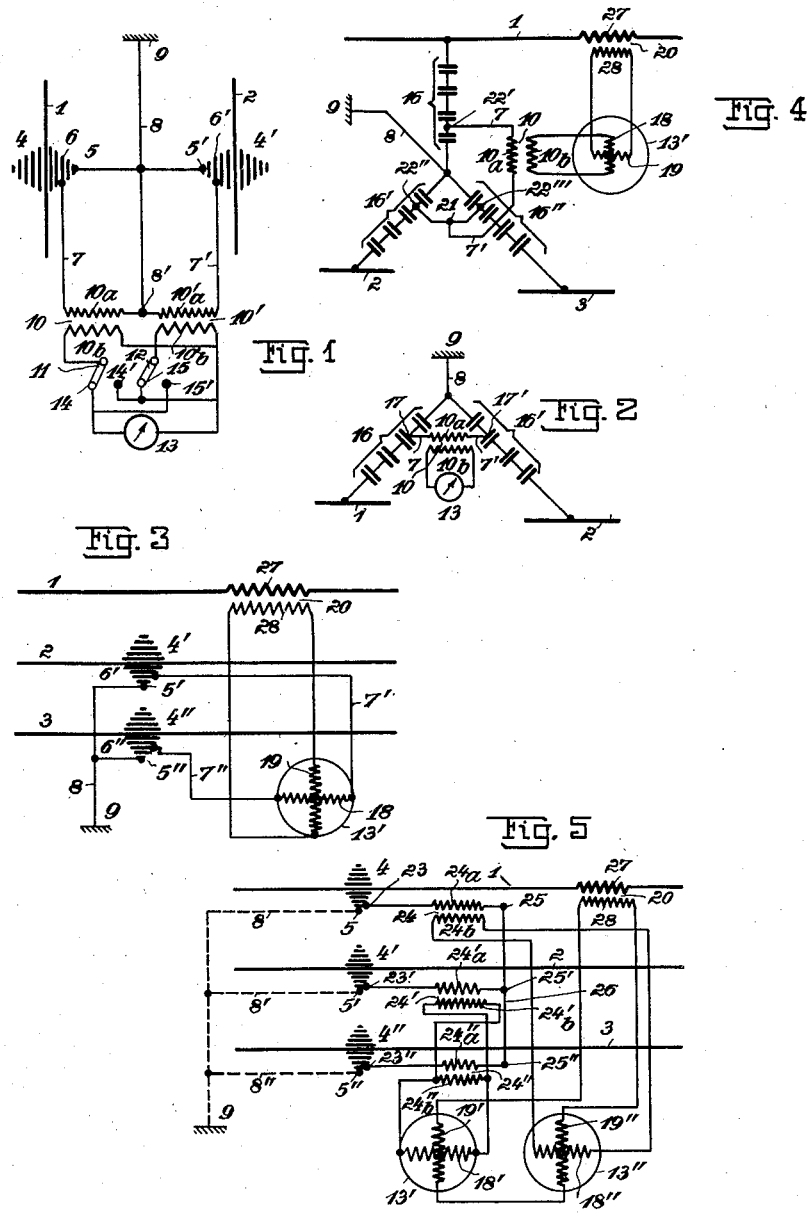
Inventors
Heinrich Kafka, and
Siegfried Klein
by Knight Bros
Attorneys Patented Feb. 15, 1927.

1,617,912

UNITED STATES PATENT OFFICE.

HEINRICH KAFKA, OF BERLIN-LICHTERFELDE-WEST, AND SIEGFRIED KLEIN, OF COPENICK, NEAR BERLIN, GERMANY, ASSIGNORS TO SIEMENS & HALSKE, AKTIENGESELLSCHAFT, OF SIEMENSSTADT, NEAR BERLIN, GERMANY, A CORPORATION OF GERMANY.

MEASURING DEVICE FOR HIGH-VOLTAGE NETWORKS.

Application filed November 30, 1923, Serial No. 677,747, and in Germany November 30, 1922.

Our invention relates to measuring devices for high voltage networks and more particularly to voltage and output measurements in double mains and three-phase current mains.

According to our invention special cascade connections of condensers or other devices already existing on the lines and acting like such condensers connected in series, for instance bushings, are utilized for connection with the measuring devices. Each of these condenser devices is connected at one end with one of the mains and at the other end with a constant potential, such as a grounded conductor. In the condensers suitable intermediate armatures are selected and connected with the measuring device, which absorbs the electric current. The measuring device may either be directly connected with these intermediate armatures or indirectly by means of measuring transformers, which are connected as current transformers. In three-phase networks a very convenient measurement of output is possible besides the voltage measurement. Preferably a dynamometric instrument is employed in this case.

Some embodiments of our invention are illustrated by way of example in the drawing, which represents in:—

Fig. 1 a connection for voltage measurement, in which the measuring device is connected with the high voltage mains, Fig. 2 a connection for voltage measurements, in which the measuring device is connected with cascade connections of condensers branching off the mains, Fig. 3 a connection for power measurement in three-phase networks by the aid of two bushings and a current transformer in one of the mains, Fig. 4 a connection for power measurement in three-phase networks in which condensers connected in cascade and a current transformer in one of the mains serve for connecting the measuring device and Fig. 5 a connection for simultaneously measuring the wattless and the effective current in a three-phase network.

Similar parts are indicated by similar reference characters in all the figures of the drawing.

Referring to Fig. 1, 4 and $4^1$ are two bushings for the high voltage mains 1 and 2. Their outer armatures 5 and 5' are connected with the conductor 8 which is earthed at 9. The intermediate armatures 6 and 6' are connected with one end respectively of the primary coils $10^a$ and $10'^a$ of the measuring transformers 10 and 10', the other ends of these coils being connected with the conductor 8 at 8'. With the secondary coils $10^b$ and $10'^b$ of the transformers 10 and 10' is connected the voltmeter 13 across the change-over switches 11 and 12. By turning the change-over switches 11 and 12 either on the contacts 14 and 15 or 14' and 15' the secondaries of the measuring transformers may alternately either be connected with the voltmeter 13 or short circuited.

Referring to Fig. 2 the two series of condensers 16 and 16' are connected at one of their ends with the mains 1, 2 respectively and at their other ends with the common conductor 8, which is grounded at 9. The intermediate elements or armatures 17 and 17' of these series are connected with the primary coil $10^a$ of the instrument transformer 10. The voltmeter 13 is connected with the secondary coil $10^b$ of the transformer.

Referring to Fig. 3, which illustrates a connection for power measuring in three-phase networks, the primary winding 27 of a current transformer 20 is arranged in the main 1, the secondary winding 28 of the transformer feeding the current winding 19 of the dynamometric instrument. In the mains 2 and 3 the outer armatures 5' and 5" of the bushings 4' and 4" are connected with the conductor 8 which is earthed at its other end at 9. The intermediate armatures 6' and 6" are connected with the voltage coil 18 of the measuring device 13'.

Referring to Fig. 4, 1, 2 and 3 are three-phase mains. In the main 1 is arranged the primary coil 27 of a current transformer 20, the secondary coil 28 of which is connected with the two terminals of the current coil 19 of the dynamometric instrument 13'. The condenser series groups 16, 16' and 16'' are connected at one of their ends with the mains 1, 2 and 3 respectively and their other ends are connected with the conductor 8 earthed at 9. Those intermediate armatures which are nearest to the constant ground potential are indicated by 22', 22'', and 22'''. The armatures 22'' and 22''' are connected by the conductor 21. The armature 22' is connected with one terminal of the primary coil 10ª of a measuring transformer 10 by a conductor 7. The other terminal of the primary coil of the transformer is connected with the conductor 21 by the conductor 7'. With the secondary coil 10ᵇ of the measuring transformer 10 is connected the voltage coil 18 of the dynamometric instrument 13'. When this connection is employed the indications of the measuring instrument 13' are independent from earth leakages of the mains. This result is attained in Fig. 4 by connecting the voltage coil of the cross-coil instrument, the current of which should be proportional to the neutral point voltage, for instance of the main 1, preferably across a measuring transformer, which is connected not only with intermediate armatures of the bushings of this main alone, but with the intermediate armatures of all three bushings located nearest to the constant potential, these intermediate armatures being connected together in series with the primary of the transformer as shown. It follows from this connection that the charging current of this intermediate armature consumed by the coil is proportional to the voltages between two mains which remain unchanged when an earth leakage occurs in one main, and therefore is proportional to the neutral point voltage.

A similar deliberation underlies the combination illustrated in Fig. 5 of a power connection and a wattless connection, which are both independent from earth leakages and similar potential displacements. Referring to this figure 1, 2 and 3 are the mains of the network 4, 4' and 4'' bushings for the mains, the outer armatures of which 5, 5' and 5'' are earthed at 9 by means of the conductors 8, 8' and 8''. In the bushings the intermediate armatures 23, 23' and 23'' next to the outer armatures 5, 5' and 5'' are connected with the conductor 26 respectively at 25, 25' and 25'' across the primary coils 24ª, 24'ª and 24''ª of the instrument transformers 24, 24' and 24''. The secondary coil 24ᵇ of the transformer 24 is connected with the voltage coil 18'' of a wattless current meter 13''. Its current coil 19'' is fed by the secondary coil 28 of the current transformer 20, the primary coil 27 of which is arranged in the main 1. The current coil 19' is connected in series with the current coil 19'' of the power current meter 13''. The voltage coil 18' of the last mentioned measuring instrument is connected in parallel with both secondary coils 24'ᵇ and 24''ᵇ of the measuring transformers 24' and 24'' one of the secondary coils, in this case 24', being connected with reversed terminals. The connections illustrated in the Figures 4 and 5 are particularly suitable for measurements in symmetrically loaded three-phase current networks.

What we claim as our invention and desire to secure by Letters Patent is:—

1. In high voltage networks having a plurality of mains, the combination of a plurality of devices having the effect of armatures of condensers connected in series, each of said devices connected with one end to one of said mains, a conductor of constant potential connected to the other end of said condenser devices, a measuring device having two coils, one of said coils being connected to intermediate armatures of said condenser devices, and a current transformer having a primary winding arranged in one of said mains, and having a secondary winding connected to the second coil of said measuring device.

2. In high voltage networks having a plurality of mains, the combination of a plurality of devices having the effect of armatures of condensers connected in series, each of said devices being connected with one end to one of said mains, a conductor of constant potential connected to the other end of said condenser devices, a plurality of conductors connecting together such intermediate armatures of said condenser devices as are located nearest to that connected to the conductor of constant potential, a measuring device having two coils, one of said coils being connected to said conductors connecting together said intermediate armatures of said condenser devices and a current transformer having a primary winding arranged in one of said mains, and having a secondary winding connected to the second coil of said measuring device.

3. In high voltage networks having a plurality of mains, the combination of a plurality of devices having the effect of armatures of condensers, connected in series, each of said devices being connected with one end to one of said mains, a conductor of constant potential connected to the other end of said condenser devices, a plurality of conductors connecting together such intermediate armatures of said condenser devices as are located nearest to that connected to the conductor of constant potential, a measuring device having two coils, one of said coils being connected to two of said conductors connecting together said intermediate armatures of said condenser devices, a current transformer having a primary winding arranged in one of said mains, and a secondary winding connected to the second coil of said measuring device, and a second measuring device having two coils, one of said coils being connected to said secondary winding of said transformer, the second coil of said second measuring device being connected to the third of said conductors connecting together said intermediate armatures of said condenser devices.

In testimony whereof we affix our signatures.

HEINRICH KAFKA.
SIEGFRIED KLEIN